(12) United States Patent
Yamato et al.

(10) Patent No.: US 7,357,719 B2
(45) Date of Patent: Apr. 15, 2008

(54) GAME SYSTEM, GAME DEVICE, AND STORAGE MEDIUM

(75) Inventors: Satoshi Yamato, Kyoto (JP); Nobuhito Koganezawa, Kyoto (JP); Daisuke Tsujimura, Kyoto (JP); Masanobu Suzui, Musashino (JP); Hirotaka Watanabe, Musashino (JP); Mitsuru Shinohara, Musashino (JP); Keiji Hara, Musashino (JP)

(73) Assignee: Nintendo Co., Ltd., Kyoto (JP)

( * ) Notice: Subject to any disclaimer, the term of this patent is extended or adjusted under 35 U.S.C. 154(b) by 852 days.

(21) Appl. No.: 10/655,035

(22) Filed: Sep. 5, 2003

(65) Prior Publication Data
US 2004/0162136 A1 Aug. 19, 2004

(30) Foreign Application Priority Data
Feb. 19, 2003 (JP) .............................. 2003-041314

(51) Int. Cl.
*A63F 13/00* (2006.01)
*A63F 9/24* (2006.01)

(52) U.S. Cl. ..................... 463/43; 463/29; 463/44; 707/2; 707/9; 705/8

(58) Field of Classification Search .................... 463/1, 463/29, 43–44; 707/2, 9; 705/8
See application file for complete search history.

(56) References Cited

U.S. PATENT DOCUMENTS

| | | | | |
|---|---|---|---|---|
| 4,593,376 A | * | 6/1986 | Volk | 705/16 |
| 4,597,058 A | * | 6/1986 | Izumi et al. | 711/115 |
| 5,162,989 A | * | 11/1992 | Matsuda | 705/1 |
| 5,497,479 A | * | 3/1996 | Hornbuckle | 463/29 |
| 5,613,089 A | * | 3/1997 | Hornbuckle | 711/164 |
| 5,715,169 A | * | 2/1998 | Noguchi | 700/237 |
| 5,810,680 A | * | 9/1998 | Lobb et al. | 473/407 |
| 5,839,956 A | * | 11/1998 | Takemoto | 463/25 |
| 5,885,156 A | * | 3/1999 | Toyohara et al. | 463/1 |
| 5,898,778 A | * | 4/1999 | Antonini | 705/56 |
| 5,918,213 A | * | 6/1999 | Bernard et al. | 705/26 |
| 6,164,971 A | * | 12/2000 | Figart | 434/154 |
| 6,251,010 B1 | | 6/2001 | Tajiri et al. | 463/1 |

(Continued)

FOREIGN PATENT DOCUMENTS

JP 2000-024315 1/2000

(Continued)

*Primary Examiner*—Robert E. Pezzuto
*Assistant Examiner*—Ryan Hsu
(74) *Attorney, Agent, or Firm*—Nixon & Vanderhye P.C.

(57) ABSTRACT

When a character is lent from a first game device to a second game device, clocks of those two game devices are synchronized, a shared lending/borrowing expiration time is set, the use of the character is temporarily disabled in the first game device, and the use of the character is temporarily enabled in the second game device. Then, a character return timing is determined, based on a time of the clock and the lending/borrowing expiration time, in the respective game devices. In accordance with the determined timing, the use of the character is enabled in the first game device, and the use of the character is disabled in the second game device. Thus, it is possible to lend/borrow a character as an item in the real world without generating a copy thereof, and the lent character is sure to be returned at the expiration of a predetermined lending/borrowing period.

17 Claims, 15 Drawing Sheets

U.S. PATENT DOCUMENTS

| | | | |
|---|---|---|---|
| 6,267,677 B1 | 7/2001 | Tajiri et al. | 463/43 |
| 6,354,941 B2* | 3/2002 | Miller et al. | 463/19 |
| 6,482,092 B1 | 11/2002 | Tajiri et al. | 463/43 |
| 6,556,768 B1* | 4/2003 | Nakajima et al. | 386/46 |
| 6,595,858 B1 | 7/2003 | Tajiri et al. | 463/31 |
| 6,758,746 B1* | 7/2004 | Hunter et al. | 463/9 |
| 6,764,402 B2 | 7/2004 | Tajiri et al. | 463/43 |
| 6,873,970 B2* | 3/2005 | Showghi et al. | 705/26 |
| 6,912,528 B2* | 6/2005 | Homer | 707/9 |
| 7,051,157 B2* | 5/2006 | James | 711/115 |
| 2002/0052238 A1* | 5/2002 | Muroi | 463/40 |
| 2002/0104019 A1* | 8/2002 | Chatani et al. | 713/201 |
| 2003/0060248 A1* | 3/2003 | Yamashita | 463/1 |

FOREIGN PATENT DOCUMENTS

| | | |
|---|---|---|
| JP | 2001-129255 | 5/2001 |
| JP | 2002-248264 | 9/2002 |

* cited by examiner

F I G. 6

| CHARACTER'S NAME | LEVEL | POWER | AGILITY | LENDING FLAG | BORROWING FLAG | LENDING/ BORROWING EXPIRATION TIME | LENDING PERMISSION/ NON-PERMISSION FLAG |
|---|---|---|---|---|---|---|---|
| CHARACTER A | 4 | 5 | 6 | × | × | — | × |
| CHARACTER B | 2 | 7 | 9 | × | × | — | × |
| CHARACTER C | 3 | 8 | 2 | × | × | — | × |
| CHARACTER D | 5 | 10 | 8 | × | × | — | ○ |
| CHARACTER E | 3 | 8 | 15 | × | × | — | ○ |
| CHARACTER F | 9 | 11 | 13 | × | × | — | × |
| CHARACTER G | 8 | 21 | 18 | ○ | × | 2003/2/5 18:00 | × |
| CHARACTER H | 12 | 21 | 13 | × | ○ | 2003/1/15 12:00 | × |

F I G. 1 3

| CHARACTER'S NAME | LEVEL | POWER | AGILITY | LENDING FLAG | BORROWING FLAG | LENDING/ BORROWING EXPIRATION TIME | LENDING PERMISSION/ NON-PERMISSION FLAG |
|---|---|---|---|---|---|---|---|
| CHARACTER A | 4 | 5 | 6 | × | × | — | × |
| CHARACTER B | 2 | 7 | 9 | × | × | — | × |
| CHARACTER C | 3 | 8 | 2 | × | × | — | × |
| CHARACTER D | 5 | 10 | 8 | × | × | — | ○ |
| CHARACTER E | 3 | 8 | 15 | × | × | — | ○ |
| CHARACTER F | 9 | 11 | 13 | × | × | — | × |
| CHARACTER G | 8 | 21 | 18 | ○ | × | 2003/2/5 18:00 | × |
| CHARACTER H | 12 | 21 | 13 | × | ○ | 2003/1/15 12:00 | ○ |

GAME SYSTEM, GAME DEVICE, AND STORAGE MEDIUM

FIELD OF THE INVENTION

The present invention relates to game systems, game devices, and storage media. More particularly, the present invention relates to a game system, a game device, and a storage medium, which enable lending/borrowing of game data between a plurality of game devices.

BACKGROUND AND SUMMARY OF THE INVENTION

Conventionally, there has been a game system allowing a character appearing in a game to be transferred or exchanged between a plurality of game devices. In the above-described game system, the plurality of game devices are interconnected by a communication cable, etc. Character-related data is transmitted from a game device that gives the character to a game device that receives the character. The data related to the transmitted character is deleted from the game device which gave the character. As a result, character transfer is realized.

The use of the above-described game system allows a player to lend his/her own character, whose ability is improved during the game, to another player for only three days. That is, character-related data is first transmitted from a game device which lends the character to a game device which borrows the character, and the same data is transmitted from the game device which borrowed the character to the game device which lent the character, thereby realizing lending and borrowing of the character.

Japanese Patent Laid-Open Publication No. 2002-233668 discloses a game system allowing character-related data to be lent/borrowed between players via a server. In this game system, a character uploaded by a player from his/her game device to the server can be downloaded by another player to his/her game device. The player who has downloaded the character can return the same character to the server as appropriate. On the other hand, the player who has uploaded the character can recall the same character from the server as appropriate.

The above-described two game systems have the following problems when lending/borrowing of a character is performed.

That is, in the former game system, it is necessary to perform data communications between two game devices in order to transmit character-related data from the game device which borrowed the character to the game device which lent the character at the time of returning the character. Thus, if the player who lent the character and the player who borrowed the character live in separate places, they are required to meet somewhere, bringing their own game device with them, in order to return the character. Also, if the player who borrowed the character forgets a borrowed character due date, the character is not returned, which is a disadvantage for the player who lent the character. Furthermore, if data related to the character is lost due to an improper operation by the player who borrowed the character during the lending period of the character, the character is not returned to the game device of the player who lent the character. Thus, there is no guarantee that the character is sure to be returned on a promised due date, which causes a player to be hesitant in lending his/her character to another player.

In the latter game system, character-related data is held in a memory card of the game device which lent the character even after the character is uploaded to the server. That is, strictly speaking, the player who lent the character only provides a copy of the character to another player rather than lends the character. As such, lending/borrowing of a character performed in the latter game system is different from lending/borrowing of an item performed in the real world. However, generation of a copy in such a manner reduces the scarcity value of a rare character which is hard to get during the game, and impairs the fascinating feature of the game. On the other hand, this allows players to be able to freely download and borrow another player's character held in the server. The player who borrowed the character may further arbitrarily determine whether or not to return the borrowed character to the server. Furthermore, even if the player who borrowed the character does not return the character to the server, the player who lent the character does not find it inconvenient because the character is merely a copy, which is also different from the lending/borrowing performed in the real world.

Therefore, a feature of the present exemplary embodiments is to provide a game system, a game device, and a game program, which allow a character appearing in the game to be lent/borrowed, without producing a copy thereof, as if it were an item of the real world, and at the same time guarantee that the character is sure to be returned at the expiration of a predetermined lending/borrowing period without the need for the lender and a borrower of the character to meet.

The present exemplary embodiments have the following characteristics to attain the feature mentioned above (notes in parentheses indicate exemplary elements which can be found in the embodiments to follow, though such notes are not intended to limit the scope of the invention).

A game system of a present exemplary embodiment is a game system comprising a plurality of game devices (a first game device, a second game device), between which game data usable in a game is operable to be exchanged. Note that characters and items appearing in the game, and techniques and magic used by the characters are included in the above-described game data usable in the game. The respective game devices include: a game data storage device (12); a game process executing mechanism (a CPU core 24 executing step S403); a time counter (an RTC 13 or a timer); a lending/borrowing period information setting mechanism (the CPU core 24 executing S206, S304); a period expiration determining mechanism (the CPU core 24 executing S2012, S2016); and a game data use controlling mechanism (the CPU core 24 executing S200, S206, S304, S2013, S2017). The game data storage device includes locations that store the game data (FIG. 6) usable in the game. The game process executing mechanism executes a game process using the data stored in the game data storage device. The time counter counts a time. Note that the time counter may be a real time clock, or may be a timer for measuring an elapsed time from a given time point. The lending/borrowing period information setting mechanism sets lending/borrowing period information shared between the game devices, which is used for setting a lending/borrowing period, when lending/borrowing of the game data is performed between the game devices. Note that the lending/borrowing period information may be information indicating a lending/borrowing period, or may be information indicating a lending/borrowing expiration time. The period expiration determining mechanism determines whether or not the lending/borrowing period is expired, in accordance with the time counter, based on the lending/borrowing period information set by the lending/borrowing period information setting mechanism. The game data use controlling mechanism controls use of individual game data in the game. The game data use controlling mechanism of a first game device (100 and 110), which is a game device which lends the game data, temporarily disables (S206) use of a piece of game data in the first game device at a time of lending the game data to a second game device (200 and 210), which is a game device which borrows the game data, and subsequently enables (S2013) use of the game data in the first game device when determination is made by the period expiration determining mechanism of the first game device that the lending/borrowing period of the game data has expired (YES at S2012). Also, the game data use controlling mechanism of the second game device temporarily enables (S304) use of a piece of game data in the second game device at a time of borrowing the game data from the first game device, and subsequently disables (S2017) use of the game data in the second game device when the determination is made by the period expiration determining mechanism of the second game device that the lending/borrowing period of the game data has expired (YES at S2016). Thus, when game data is lent, the use of the game data is temporarily prohibited in a game device which lends the game data, and the use of the game data is prohibited in a device which borrowed the game data when the game data is returned. As a result, a copy of the game data is not produced, thereby realizing more realistic lending/borrowing. Also, the game device which lent the game data and the game device which borrowed the game data individually manage the lending/borrowing period, and individually execute a game data return process (that is, the device which lent the game data executes a process for enabling the use of the game data again, and the game device which borrowed the game data executes a process for disabling the use of the game data) after a lapse of the lending/borrowing period. Thus, it is not necessary to perform data communications when the game data is returned, thereby saving the trouble of connecting the two devices to each other. Also, it is guaranteed that the game data is returned on the due date.

Also, based on the above-described game system, the lending/borrowing period information setting mechanism may set an expiration time of the lending/borrowing period of the game data, the time counter may be a clock (13) for counting a real time, when a piece of game data is lent from the first game device to the second game device, the lending/borrowing expiration time of the game data shared between the first game device and the second game device may be set (S206, S304). The period expiration determining mechanism of the first game device may determine whether or not the lending/borrowing period is expired (S2012) based on the lending/borrowing expiration time set by the lending/borrowing period information setting mechanism of the first game device and a time of the clock of the first game device, and the period expiration determining mechanism of the second game device may determine whether or not the lending/borrowing period is expired (S2016) based on the lending/borrowing expiration time set by the lending/borrowing period information setting mechanism of the second game device and a time of the clock of the second game device. Thus, a player who lends/borrows the character is aware of a return date and time of the game data (for example, 10 a.m., April 5).

Also, based on the above-described game system, a time of the clock of the first game device and a time of the clock of the second game device may be synchronized (S204, S302) by data communications when a piece of game data is lent from the first game device to the second game device. Thus, a time lag between a clock of the game device which lends the game data and a clock of the game device which borrows the game data is previously corrected, thereby avoiding a situation, for example, in which lending/borrowing periods of the respective game devices are expired at different times, even if a lending/borrowing expiration time shared between the game device which lent the game data and the game device which borrowed the game data has been set.

Also, in the above-described game system, the respective game devices may further include a time setting mechanism (the CPU core 24 executing S109) for allowing a player to change a time of the clock (S503) if there is no lent/borrowed game data (NO at S501 and NO at S502), and prohibiting the player from changing a time of the clock (S504) if there is any lent/borrowed game data (YES at S501 or YES at S502). Note that a change of a time may be allowed irrespective of whether or not there is any borrowed game data if there is no lent game data, or a change of a time may be allowed irrespective of whether or not there is any lent game data if there is no borrowed game data. Alternatively, a change of a time may be allowed only when there is no lent game data and there is no borrowed game data. Thus, it is possible to prevent unauthorized extension of the lending/borrowing period of the game data by the player who borrows the game data by turning back the clock before the lending/borrowing period of the game data is expired.

Also, based on the above-described game system, the respective game devices may execute a game process by connecting a game cartridge (110) storing a game program to a main unit (100) executing a game process based on the game program, and the clock (13), which is built into the game cartridge (110), may count a real time irrespective of whether or not the game cartridge is connected to the main unit. Thus, it is possible to prevent the clock from being set arbitrarily by the player when the game in which lending/borrowing of game data is performed is not played (that is, when a cartridge of the game is not inserted into the main unit) in the game device allowing the player to interchange a game cartridge and enjoy a plurality of games by inserting a game cartridge corresponding to a desired game into the main unit.

Also, based on the above-described game system, a count value of the time counter may not be capable of being changed by the player (S504). Thus, it is possible to prevent unauthorized extension of the lending/borrowing period by the player.

Also, based on the above-described game system, the second game device may notify (S603) a third game device of the lending/borrowing period information of the game data, which is shared between the first game device and the second game device, at a time of subletting the game data borrowed from the first game device to the third game device, and the game data use controlling mechanism of the second game device may disable (S604) use of the game data in the second game device, and the game data use controlling mechanism of the third game device may temporarily enable use of the game data in the third game device at a time of borrowing the game data from the second game device, and may subsequently disable use of the game data in the third game device when determination is made by the period expiration determining mechanism of the third game device that the lending/borrowing period based on the lending/borrowing period information, which is notified by the second game device, has expired. Thus, even if, after game data is lent from a game device (the first game device) to another game device (the second game device), the game data is lent from the second game device to still another game device (a third game device), in other words, even if so-called subletting is performed, a game device, which is an original lender of the game data, and a game device, which is a final borrower of the game data, individually manage the lending/borrowing period, and individually execute a return process (that is, the game device which lent the game data performs a process for enabling the use of the game data again, and the game device which borrowed the game data performs a process for prohibiting the use of the game data) of the game data after a lapse of the lending/borrowing period. Thus, it is not necessary to perform data communications when the game data is returned, thereby saving the trouble of connecting the two devices to each other. Furthermore, in general, when subletting is performed, there is a high possibility that the sublet item is never returned to the original lender. However, the present game system guarantees that the game data is sure to be returned on a due date even if subletting is performed.

Also, based on the above-described game system, the time counter may be a clock for counting a real time, the period expiration determining mechanism may determine whether or not the lending/borrowing period is expired based on a time of the clock, and a time of the clock of the first game device and a time of the clock of the second game device may be synchronized by data communications when a piece of game data is lent from the first game device to the second game device, and a time of the clock of the third game device may be adjusted to a time of the clock of the second game device by data communications when the game data is sublet from the second game device to the third game device. Thus, when game data is lent to another game device, the use of the game data is temporarily prohibited, whereby a copy of the game data is not produced. As a result, more realistic lending/borrowing can be realized. Also, the present game device manages the lending/borrowing period, and executes a game data return process (that is, a process for enabling the use of the game data again). Thus, it is not necessary to perform data communications when the game data is returned, thereby saving the trouble of connecting the two devices to each other. Also, it is guaranteed that the game data will be returned on the due date.

A game device of a present exemplary embodiment is a game device operable to exchange game data, which is usable in a game, with another game device, comprising: a game data storage device (12); a game process executing mechanism (the CPU core 24 executing S403); a time counter (13); a lending/borrowing period information setting mechanism (the CPU core 24 executing S206); a period expiration determining mechanism (the CPU core 24 executing S2012); and a game use controlling mechanism (the CPU core 24 executing S200, S206, S2013). The game data storage device includes locations which store the game data (FIG. 6) usable in the game. The game process executing mechanism executes a game process using the data stored in the game data storage device. The time counter counts a time. The lending/borrowing period information setting mechanism sets lending/borrowing period information shared between the game devices, which is used for setting a lending/borrowing period, when lending/borrowing of the game data is performed between the game devices. The period expiration determining mechanism determines whether or not the lending/borrowing period is expired, in accordance with the time counter, based on the lending/borrowing period information of the game data, which is shared between the game devices, after lending/borrowing of the game data is performed between the game devices. The game use controlling mechanism controls use of individual game data in the game. The game data use controlling mechanism temporarily disables (S206) use of a piece of game data at a time of lending the game data to another game device which borrows the game data, and subsequently enables (S2013) use of the game data when determination is made by the period expiration determining mechanism that the lending/borrowing period of the game data has expired (YES at S2012).

A storage medium of a present exemplary embodiment is a computer-readable storage medium (11) storing a game program for enabling exchange of game data, which is usable in a game, between a plurality of game devices (the first game device, the second game device). The game program causes computers of the respective game devices to function as: a game process executing mechanism (the CPU core 24 executing S403); a lending/borrowing period information setting mechanism (the CPU core 24 executing S206, S304); a period expiration determining mechanism (the CPU core 24 executing S2012, S2016); and a game data use controlling mechanism (the CPU core 24 executing S200, S206, S304, S2013, S2017). The game process executing mechanism executes a game process using data stored in game data storage device (12) included in the respective game devices for storing the game data (FIG. 6) usable in the game. The lending/borrowing period information setting mechanism sets lending/borrowing period information shared between the game devices, which is used for setting a lending/borrowing period, when lending/borrowing of the game data is performed between the game devices. The period expiration determining mechanism determines whether or not the lending/borrowing period is expired, in accordance with time counter (13) included in the respective game devices for counting a time, based on the lending/borrowing period information set by the lending/borrowing period information setting mechanism. The game data use controlling mechanism controls use of individual game data in the game. The game data use controlling mechanism of a first game device (100 and 110), which is a game device which lends the game data, temporarily disables (S206) use of a piece of game data in the first game device at a time of lending the game data to a second game device (200 and 210), which is a game device which borrows the game data, and subsequently enables (S2013) use of the game data in the first game device when determination is made by the period expiration determining mechanism of the first game device that the lending/borrowing period of the game data has expired (YES at S2012). Also, the game data use controlling mechanism of the second game device temporarily enables (S304) use of a piece of game data in the second game device at a time of borrowing the game data from the first game device, and subsequently disables (S2017) use of the game data in the second game device when determination is made by the period expiration determining mechanism of the second game device that the lending/borrowing period of the game data has expired (YES at S2016).

A game cartridge (110) of a present exemplary embodiment comprises a computer-readable storage medium (11) storing a game program for enabling exchange of game data, which is usable in a game, between a plurality of game devices (the first game device, the second game device), a game data storage device (12) for storing the game data (FIG. 6) usable in the game, and a time counter (13) for counting a time. The game program stored in the storage medium causes a computer (the CPU core 24) of the game device to function as: a game process executing mechanism (the CPU core 24 executing S403); a lending/borrowing period information setting mechanism (the CPU core 24 executing S206, S304); a period expiration determining mechanism (the CPU core 24 executing S2012, S2016); and a game data use controlling mechanism (the CPU core 24 executing S200; S206, S304, S2013, S2017). The game process executing mechanism executes a game process using the data stored in the game data storage device. The lending/borrowing period information setting mechanism sets lending/borrowing period information shared between the game devices, which is used for setting a lending/borrowing period, when lending/borrowing of the game data is performed between the game devices. The period expiration determining mechanism determines whether or not the lending/borrowing period is expired, in accordance with the time counter, based on the lending/borrowing period information set by the lending/borrowing period information setting mechanism. The game data use controlling mechanism controls use of individual game data in the game. The game data use controlling mechanism is operable to: temporarily disable (S206) use of a piece of game data at a time of lending the game data to another game device, and subsequently enable (S2013) use of the game data when the determination is made by the period expiration determining mechanism that the lending/borrowing period of the game data has expired (YES at S2012); and temporarily enable (S304) use of a piece of game data at a time of borrowing the game data from another game device, and subsequently disable (S2017) use of the game data when the determination is made by the period expiration determining mechanism that the lending/borrowing period of the game data has expired (YES at S2016).

These and other features, aspects and advantages of the present invention will become more apparent from the following detailed description of the present invention when taken in conjunction with the accompanying drawings.

BRIEF DESCRIPTION OF THE DRAWINGS

FIG. 6 is an illustration showing an exemplary character data table;

FIG. 13 is an illustration showing an exemplary character data table when subletting is performed;

DETAILED DESCRIPTION OF THE PREFERRED EMBODIMENTS

Hereinafter, various embodiments of the present invention will be described with reference to the drawings.

(First Embodiment)

Figure 1:
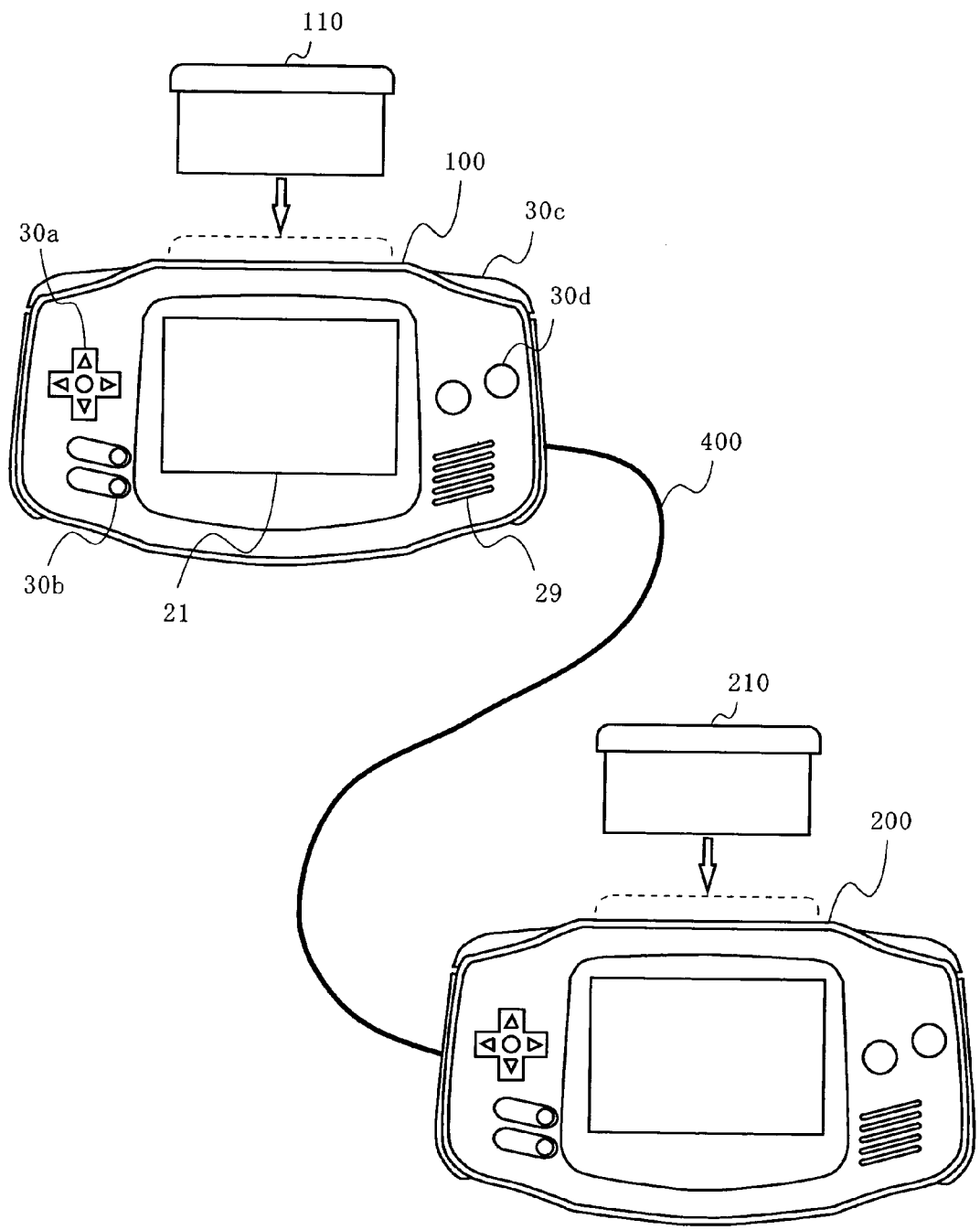
FIG. 1 is an illustration of an external view of a game system according to a first embodiment of the present invention.

FIG. 1 shows an external view of a game system according to a first embodiment of the present invention. In the present game system, two game devices (hereinafter, referred to as "a first game device" and "a second game device") are connected with each other via a communication cable 400. The first game device includes a game cartridge 110 and a main unit 100, and the second game device includes a game cartridge 210, and a main unit 200. In the present embodiment, the first game device and the second game device have an identical structure. Thus, hereinafter, only the structure of the first game device will be described. The main unit 100 of the first game device includes an LCD 21 (liquid crystal display), a loudspeaker 29, and operation switches (for example, operation switches 30*a* to 30*d*).

Figure 2:
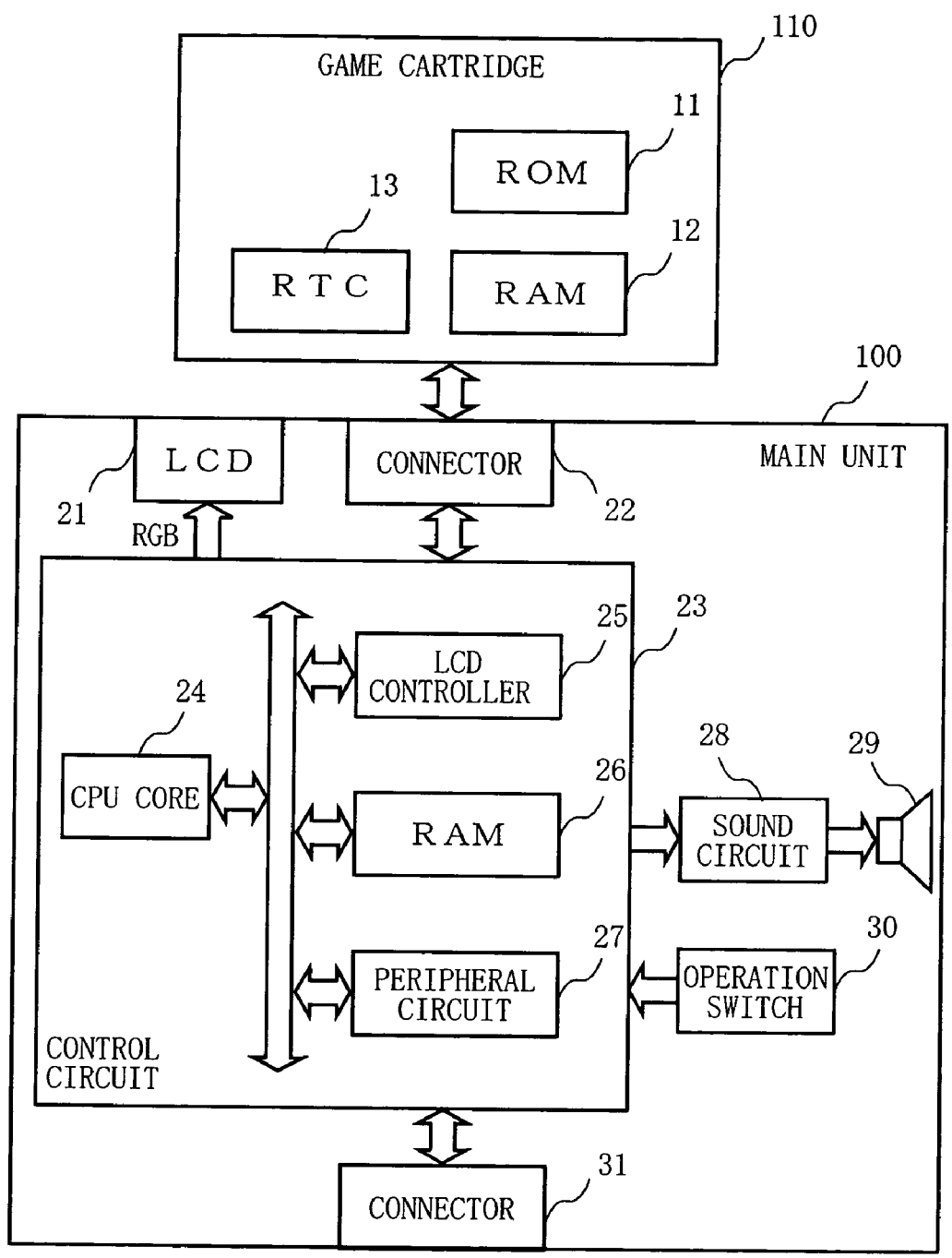
FIG. 2 is an illustration showing the internal structure of a game device.

Then, with reference to FIG. 2, the internal structure of the first game device is described. The game cartridge 110 includes a ROM 11 including locations for storing a game program, a RAM 12 including locations for storing a character data table, which will be described below, and an RTC 13 (Real Time Clock). Note that the RAM 12 is battery-protected so that its storage contents are maintained even if the power to the main unit 100 is disconnected or the cartridge 110 is removed from the main unit 100. Also, another rewritable storage device such as a flash memory, etc., may be used in place of the RAM 12. Power is constantly supplied to the RTC 13 by a battery (not shown) included in the game cartridge 110, whereby the RTC 13 can keep counting a time irrespective of whether or not the game cartridge 110 is connected with the main unit 100.

The main unit 100 includes the LCD 21 for displaying a game image, a connector 22 for connecting the game cartridge 110, a control circuit 23 for executing a game process based on the game program supplied from the game cartridge 110, a sound circuit 28 for driving a loudspeaker based on sound data, the loudspeaker 29, the operation switches 30, and a connector 31 for connecting the communication cable 400. The control circuit 23 includes a CPU core 24 for executing various processes based on the program, an LCD controller 25 for driving the LCD 21, a RAM 26 for functioning as a work memory of the CPU core 24, and other peripheral circuits 27. Note that the structure of the main unit 100 is the same as that of an ordinary game device, with the detailed descriptions thereof omitted.

Exemplary operation of the present game system is described below.

Figure 3:
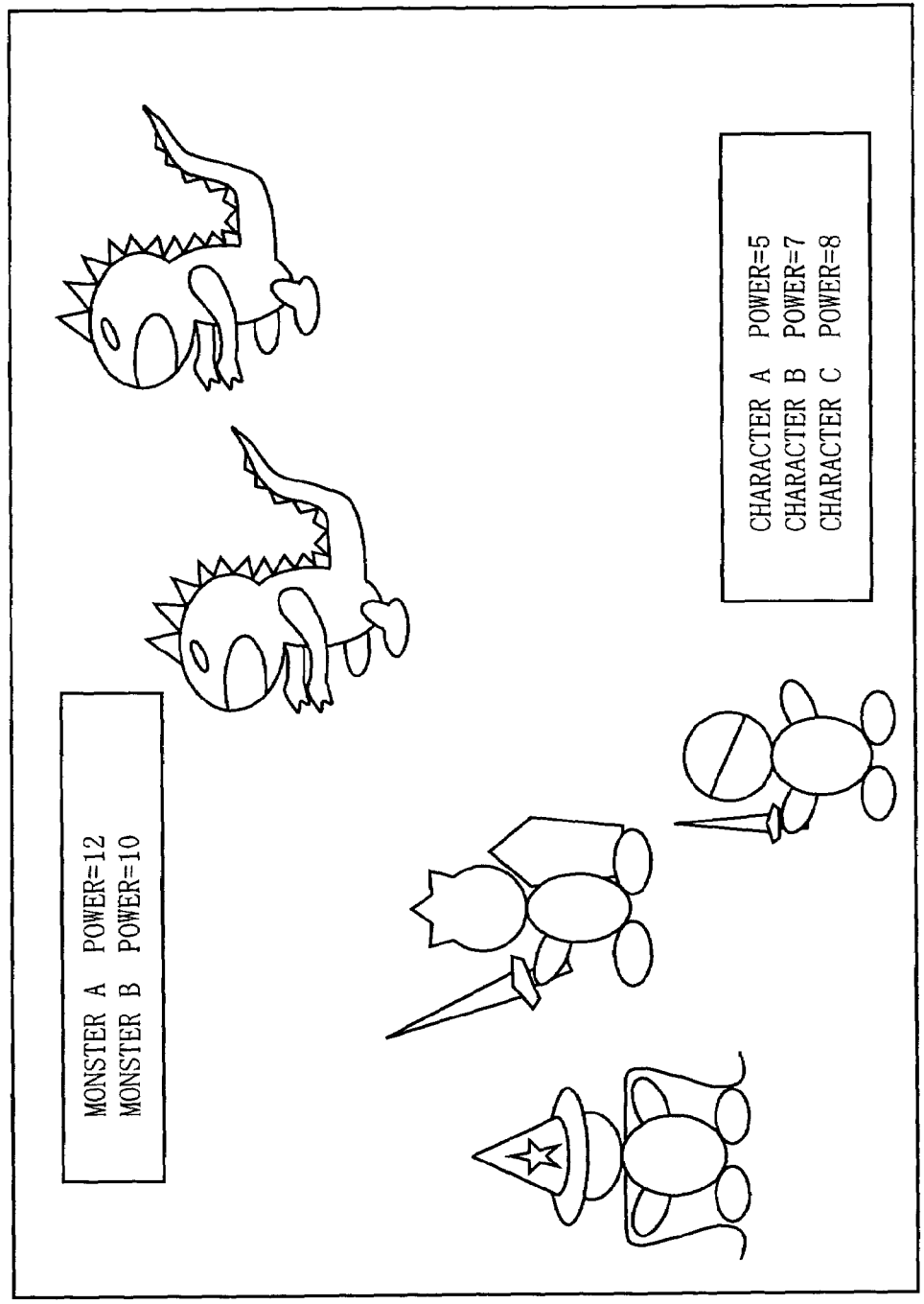
FIG. 3 is an illustration showing an exemplary game screen.

By way of example, as shown in FIG. 3, a case where a character appearing in a game is lent/borrowed to/from another game device in the game in which a party including a plurality of characters (for example, characters A to D) fights a battle with monsters (for example, a monster A and a monster B) will be described.

Hereinafter, with reference to various flowcharts, a process flow of the CPU core 24, which is performed in accordance with the game program stored in the ROM 11, is described.

When the power is applied to the main unit 100 while the game cartridge 110 is connected thereto, the CPU core 24 first causes the LCD 21 to display a menu (step S101), and urges a player to select a menu item. This menu includes four menu items: "lending of a character", "borrowing of a character", "game start", and "time setting". If the "lending of a character" item is selected from the menu by a player (YES at step S102), the CPU core 24 executes a lending process (step S103), and displays the menu again after the lending process is completed. If the "borrowing of a character" item is selected from the menu (YES at step S104), the CPU core 24 executes a borrowing process (step S105), and displays the menu again after the borrowing process is completed. If the "game start" item is selected from the menu (YES at step S106), the CPU core 24 executes a game process (step S107), and displays the menu again after the game process is completed. If the "time setting" item is selected from the menu (YES at step S108), the CPU core 24 executes a time setting process (step S109), and displays the menu again after the time setting process is completed.

Figure 4:
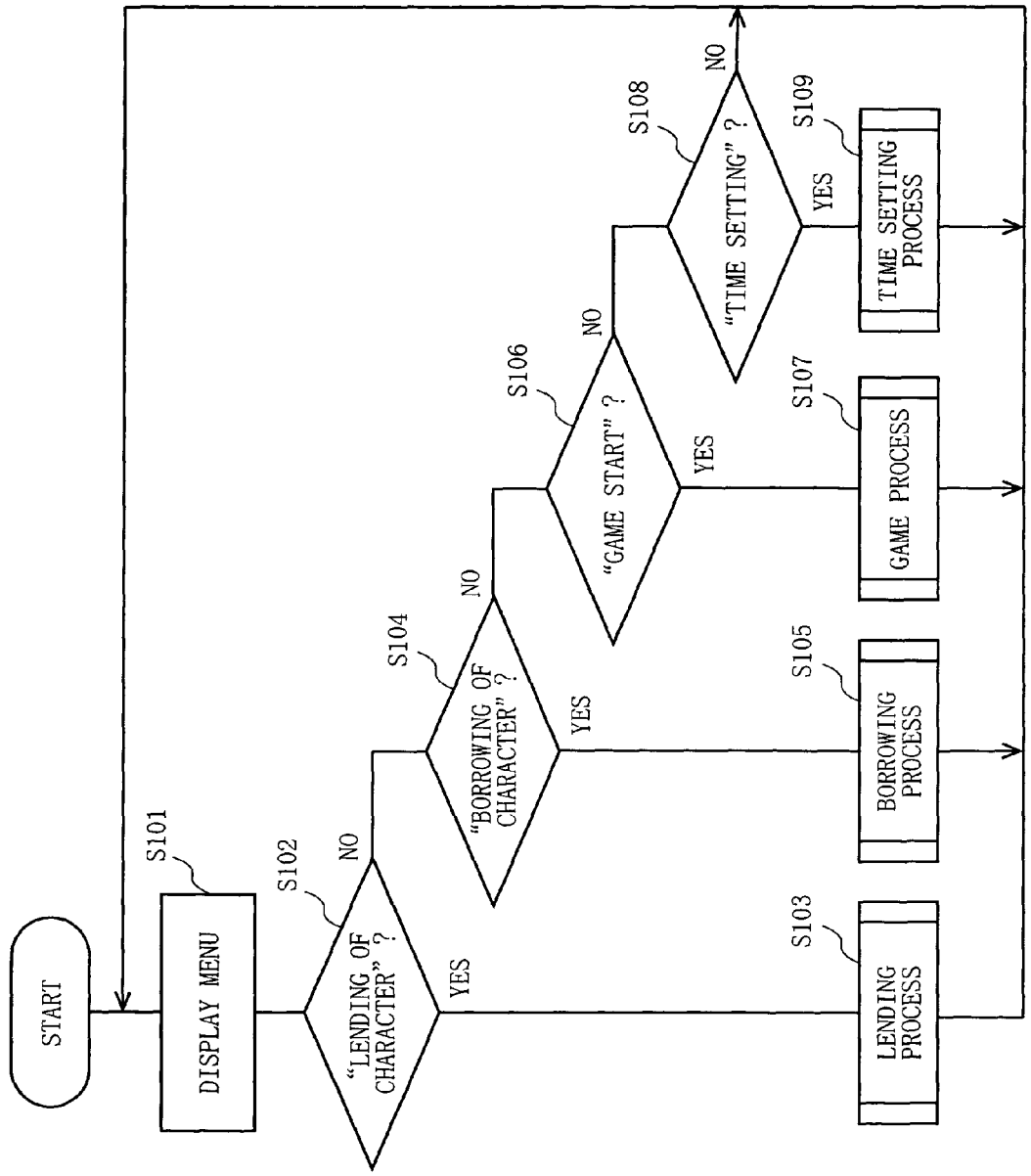
FIG. 4 is a flowchart showing a process of a CPU core 24.

Hereinafter, the lending process, the borrowing process, the game process, and the time setting process shown in FIG. 4 are described in detail.

Figure 5:
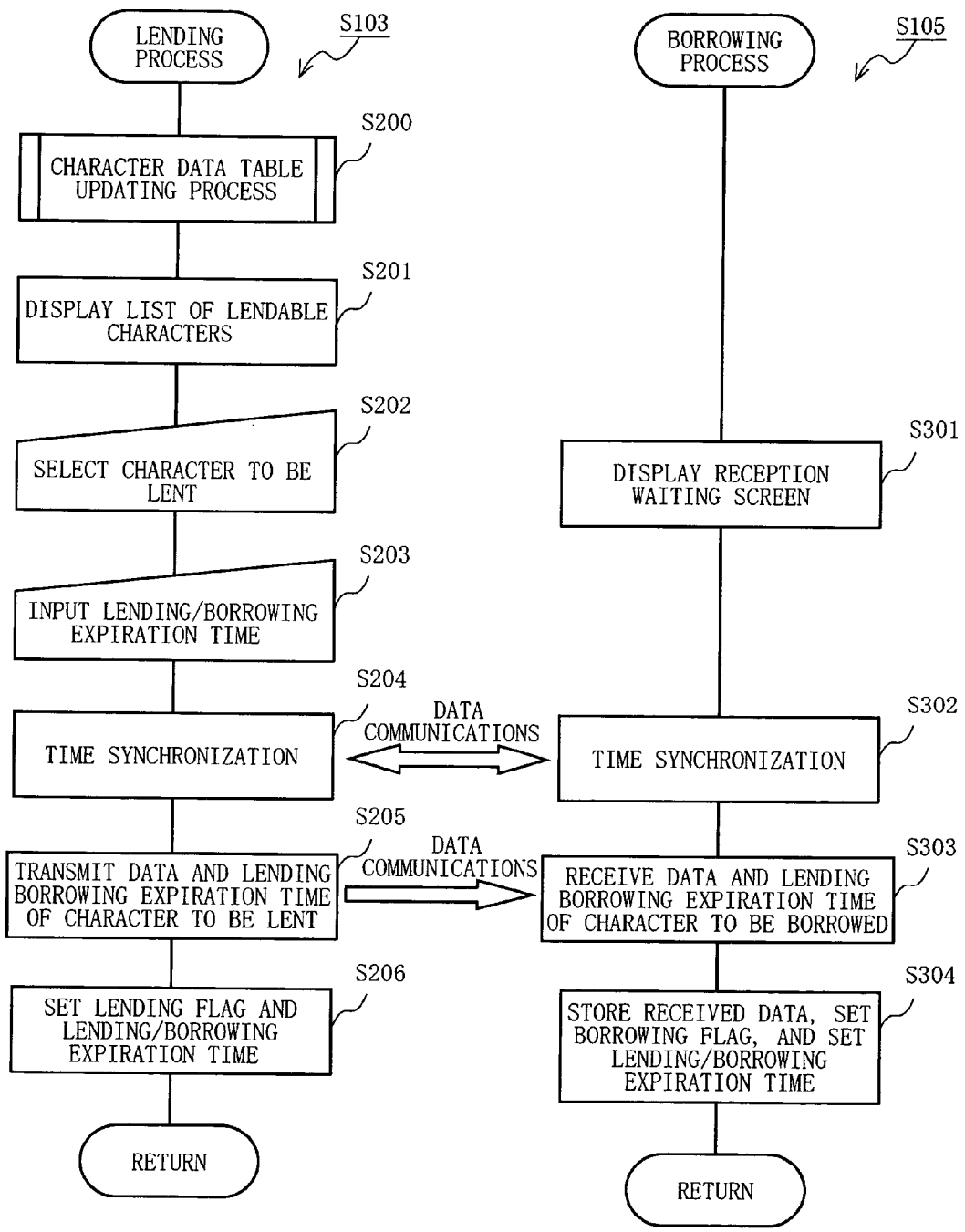
FIG. 5 is a flowchart showing a lending process and a borrowing process.

In the present game system, the first game device and the second game device are first connected to each other by the communication cable 400 as shown in FIG. 1 in the case where, for example, a player operating the first game device lends a character to a player operating the second game device. Then, the player operating the first game device selects the "lending of a character" item from the menu displayed on the LCD 21 of the first game device, and the player operating the second game device selects the "borrowing of a character" item from the menu displayed on the LCD 21 of the second game device. FIG. 5 shows the lending process executed by the CPU core 24 of the first game device, and the borrowing process executed by the CPU core 24 of the second game device. Hereinafter, with reference to the flowcharts shown in FIG. 5, operations of the respective CPU cores 24 of the first and second game devices will be described.

The RAM 26 and the RAM 12 of the respective game devices store a character data table shown in FIG. 6. The character data table stores data (for example, character's name, level, power, and agility) about individual characters appearing in the game. The character data table is changed with the progress of the game. A temporary character data table of the ongoing game is stored in the RAM 26, and the character data table in the RAM 26 is copied and stored in the RAM 12 as appropriate, for example, when the player temporarily stops playing the game or the player gives an instruction to store the game data. Also, in the character data table, as shown in FIG. 6, a lending flag, a borrowing flag, a lending/borrowing expiration time, and a lending permission/non-permission flag are stored for individual characters. The lending flag indicates whether or not a character is lent to another game device. The borrowing flag indicates whether or not a character is borrowed from another game device. The lending/borrowing expiration time indicates a time at which the lending/borrowing period is expired. The lending permission/non-permission flag indicates whether or not a character is permitted to be lent to another game device. The present embodiment prohibits lending of a character which is a member of the current party, a character which is previously prohibited to be lent, a character which is lent to another game device, and a character which is borrowed from another game device. However, a setting method of the lending permission/non-permission flag is not limited thereto, and the lending permission/non-permission flag may be arbitrarily set (note that, even in this case, lending of a character which is lent to another game device has to be prohibited).

Figure 7:
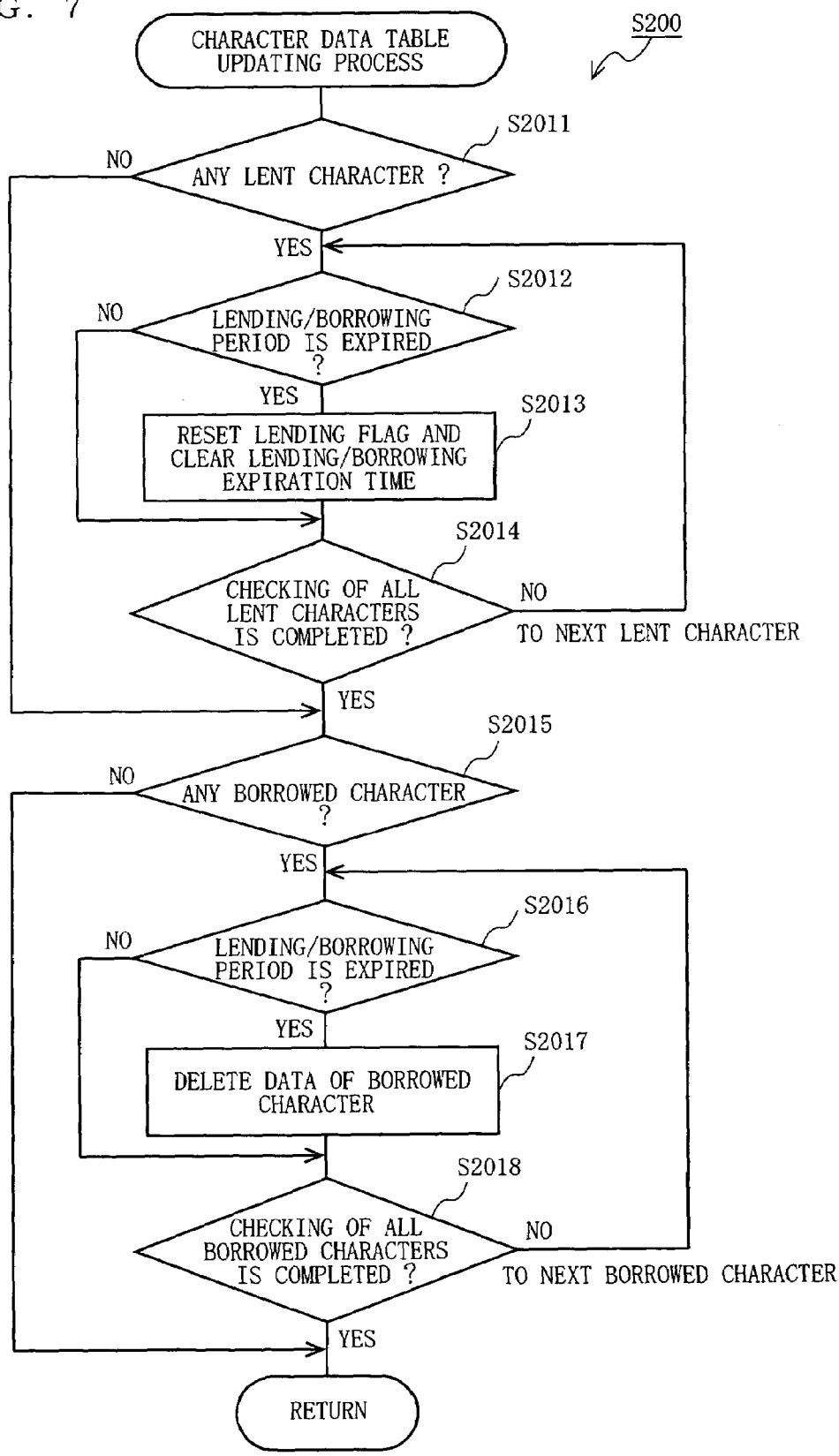
FIG. 7 is a flowchart showing a character data table updating process.

In FIG. 5, the CPU core 24 of the first game device first executes a character data table updating process shown in FIG. 6 (S200). With reference to a flowchart shown in FIG. 7, the character data table updating process is described. First, based on the lending flag of the character data table shown in FIG. 6, the CPU core 24 determines whether or not there is any lent character (S2011). If the determination is made that there is a character whose lending flag is set (YES at step S2011), the CPU core 24 determines whether or not the lending/borrowing period of the character is expired (S2012). Specifically, the lending/borrowing expiration time of the character is compared with a time of the RTC 13, thereby determining whether or not the lending/borrowing period is expired. If the determination is made that the lending/borrowing period has expired, the lending flag of the character is reset, and the lending/borrowing expiration time is cleared (S2013). Thus, in the first game device, the character becomes usable in the game. Next, the CPU core determines whether or not checking of the lending/borrowing period is performed for all the lent characters (S2014). If the determination is made that there is a character for which checking is not performed, the lending/borrowing period thereof is checked in similar manners (S2012). Hereinafter, checking of the lending/borrowing period is performed in similar manners for all the lent characters.

If the determination is made at step S2011 that there is no lent character, or the determination is made at step S2014 that the lending/borrowing period of all the lent characters is checked, the CPU core 24 determines, based on the borrowing flag of the character data table shown in FIG. 6, whether or not there is any borrowed character (S2015). If the determination is made that there is a character whose borrowing flag is set (YES at step S2015), the CPU core 24 determines whether or not the lending/borrowing period of the character is expired (S2016). Specifically, the lending/borrowing expiration time of the character is compared with a time of the RTC 13, thereby determining whether or not the lending/borrowing period is expired. If the determination is made that the lending/borrowing period has expired, the data of the character is deleted from the character data table (S2017). Thus, in the second game device, the character becomes unusable in the game. Note that, in place of deleting the data of the character, a flag indicating whether or not the character is prohibited to be used in the game may be additionally provided and set. Next, the CPU core 24 determines whether or not checking of the lending/borrowing period is performed for all the borrowed characters (S2018). If the determination is made that there is a character for which checking is not performed, the lending/borrowing period thereof is checked in similar manners (S2016). Hereinafter, checking of the lending/borrowing period is performed in similar manners for all the borrowed characters.

If the determination is made at step S2015 that there is no borrowed character, or the determination is made at step S2018 that the lending/borrowing period of all the borrowed characters is checked, the character data table updating process is completed, and a process of the CPU core 24 proceeds to step S201 shown in FIG. 5.

Figure 8:
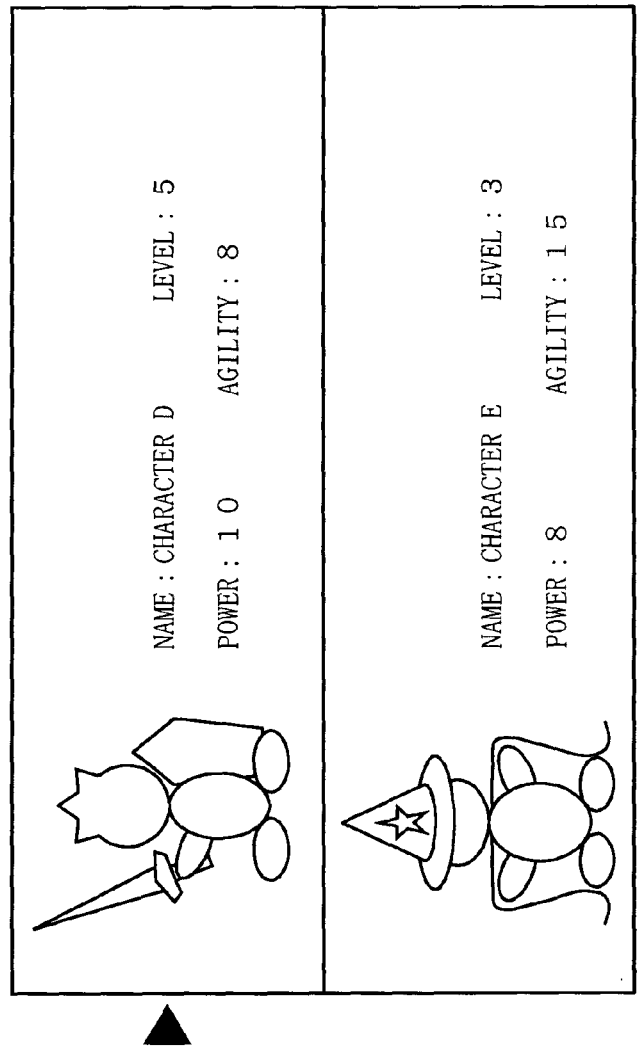
FIG. 8 is an illustration showing an exemplary screen display when a character to be lent is selected.

In FIG. 5, after the completion of the character data table updating process, the CPU core 24 causes the LCD 21 to display a list of lendable characters (S201). More specifically, the CPU core 24 causes a list of the characters whose lending permission/non-permission flags are set (in the drawing, indicated by a "o" symbol) to be displayed. An exemplary screen display of the above-described list is shown in FIG. 8. The player of the first game device operates the operation switches 30, and selects a character to be lent (S202). Then, the CPU core 24 requests the player to input a lending/borrowing expiration time of the selected character. In response to the above-described request, the player inputs the lending/borrowing expiration time (S203). Note that, in place of being input by the player, the lending/borrowing expiration time may be automatically set (for example, three days later after the current time of the RTC 13). Also, the lending/borrowing period may be input by the player, whereby the lending/borrowing expiration time is calculated and set based on the current time of the RTC 13 and the lending/borrowing period input by the player.

On the other hand, the CPU core 24 of the second game device causes the LCD 21 of the second game device to display a message for instructing the player of the second game device to stand by during a period in which the player of the first game device is inputting the lending/borrowing expiration time (S301).

When the player of the first game device inputs the lending/borrowing expiration time at step S203, the first game device and the second game device synchronizes the times of the respective RTCs 13(S204, S302). As a time synchronization method, various methods can be adopted. For example, a time of the RTC 13 of the first game device may be transmitted to the second game device, thereby adjusting a time of the RTC 13 of the second game device to the time of the RTC 13 of the first game device. Alternatively, for example, a time of the RTC 13 of the second game device may be transmitted to the first game device, thereby adjusting a time of the RTC 13 of the first game device to the time of the RTC 13 of the second game device. Alternatively, for example, times of the respective RTCs 13 may be transmitted to each other, thereby changing the times of the respective RTCs 13 so as to become a time right between a time of the RTC 13 of the first game device and a time of the RTC 13 of the second game device. Alternatively, in place of adjusting times of the respective RTCs 13 of the first and second game devices to be coincident with each other, the times may not be changed if an error therebetween is within permissible limits.

After the completion of time synchronization, the CPU core 24 of the first game device transmits data of the character selected at step S202 ("character's name", "level", "power", and "agility" in the character data table shown in FIG. 6) and the lending/borrowing expiration time input at step S203 to the second game device (S205). Then, in the character data table shown in FIG. 6, the lending flag of the lent character is set (the symbol "o" is changed into a symbol "x"), and the lending/borrowing expiration time is set (S206).

On the other hand, the CPU core 24 of the second game device receives the data transmitted at step S205 by the CPU core 24 of the first game device (S303), and updates the character data table of the second game device based on the received data (S304). Specifically, "character's name", "level", "power", and "agility" of the borrowed character are stored in the character data table, the borrowing flag is set, and the lending/borrowing expiration time is set.

As a result of the above-described processes, the first game device is not allowed to use the character, which is lent to the second game device, in the game (that is, not allowed to add the character in the party), and the second game device is allowed to use the character, which is borrowed from the first game device, in the game (that is, allowed to add the character in the party).

Next, the game process to be executed if the "game start" item is selected from the menu displayed at step S101 of FIG. 4 (YES at step S106) will be described with reference to a flowchart shown in FIG. 9.

Figure 9:
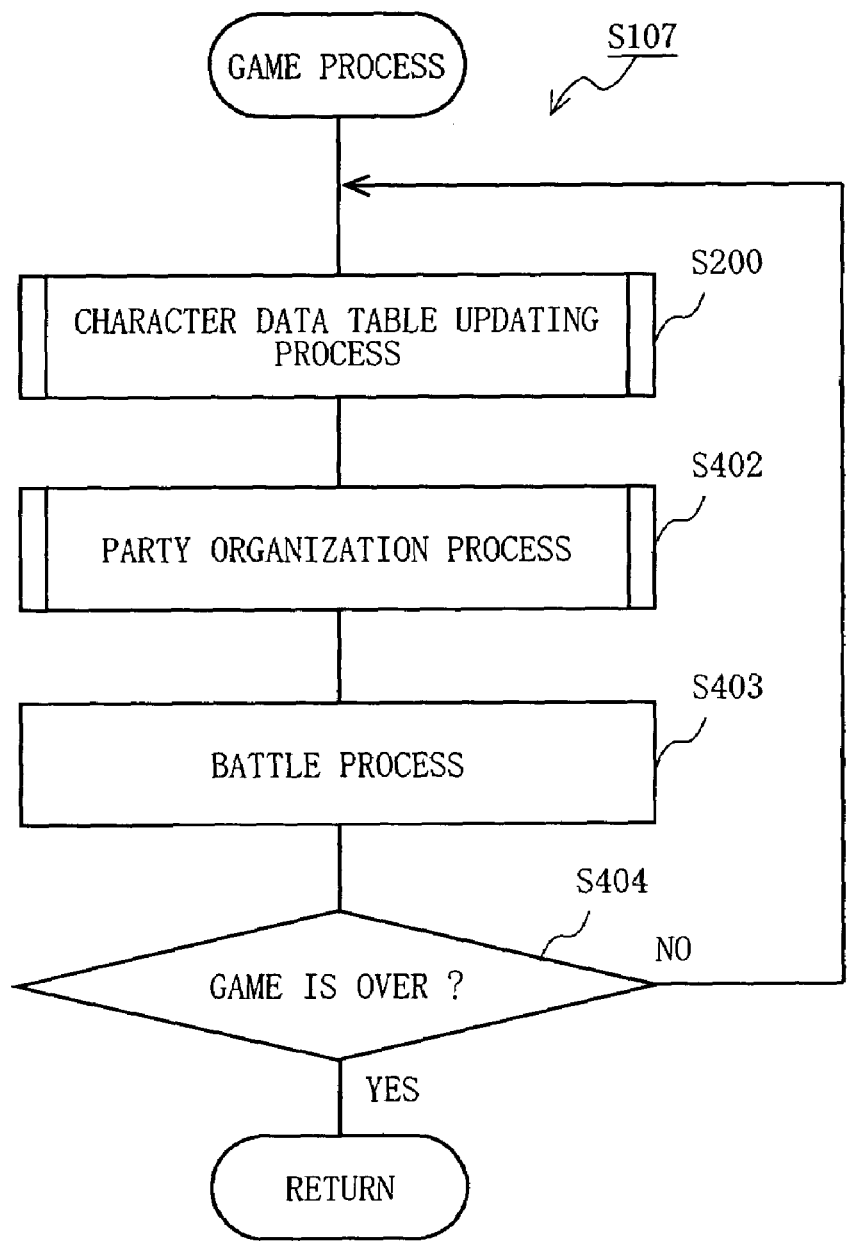
FIG. 9 is a flowchart showing a game process.

In FIG. 9, when the game process is started, the CPU core 24 first executes the character data table updating process (S200). The above-described character data updating process is similar to the process shown in FIG. 7, with the descriptions thereof omitted. Next, the CPU core 24 executes a party organization process (S402). The details of the party organization process will be described below. Furthermore, the CPU core 24 performs a battle process (S403). Here, as shown in FIG. 3, the party organized at step S402 wages a battle against the monsters. The CPU core 24 repeats the above-described process (No at step S404) until the game is over, and goes back to step S101 shown in FIG. 4 when the game is over (YES at step S404).

Figure 10:
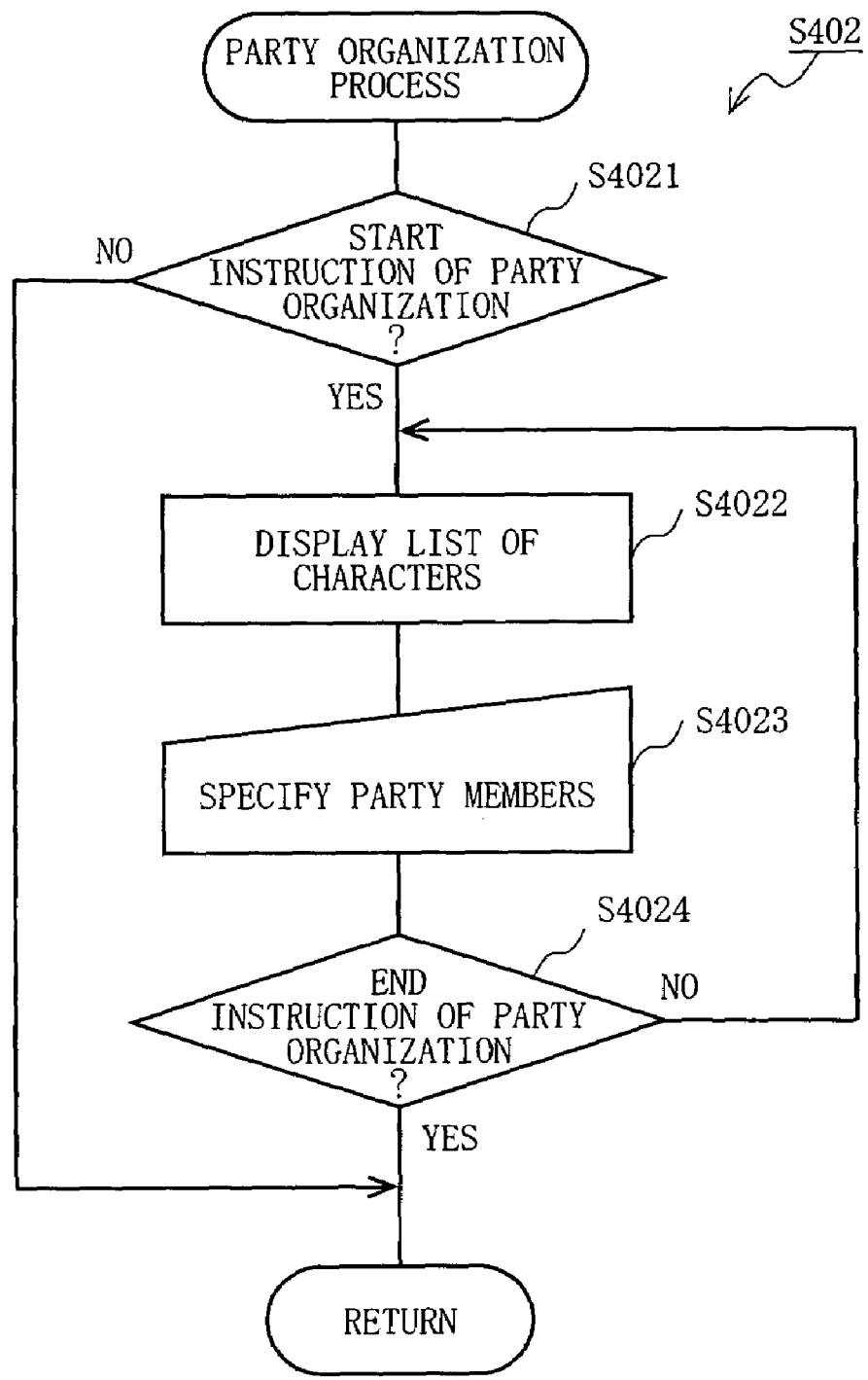
FIG. 10 is a flowchart showing a party organization process.
Figure 11:
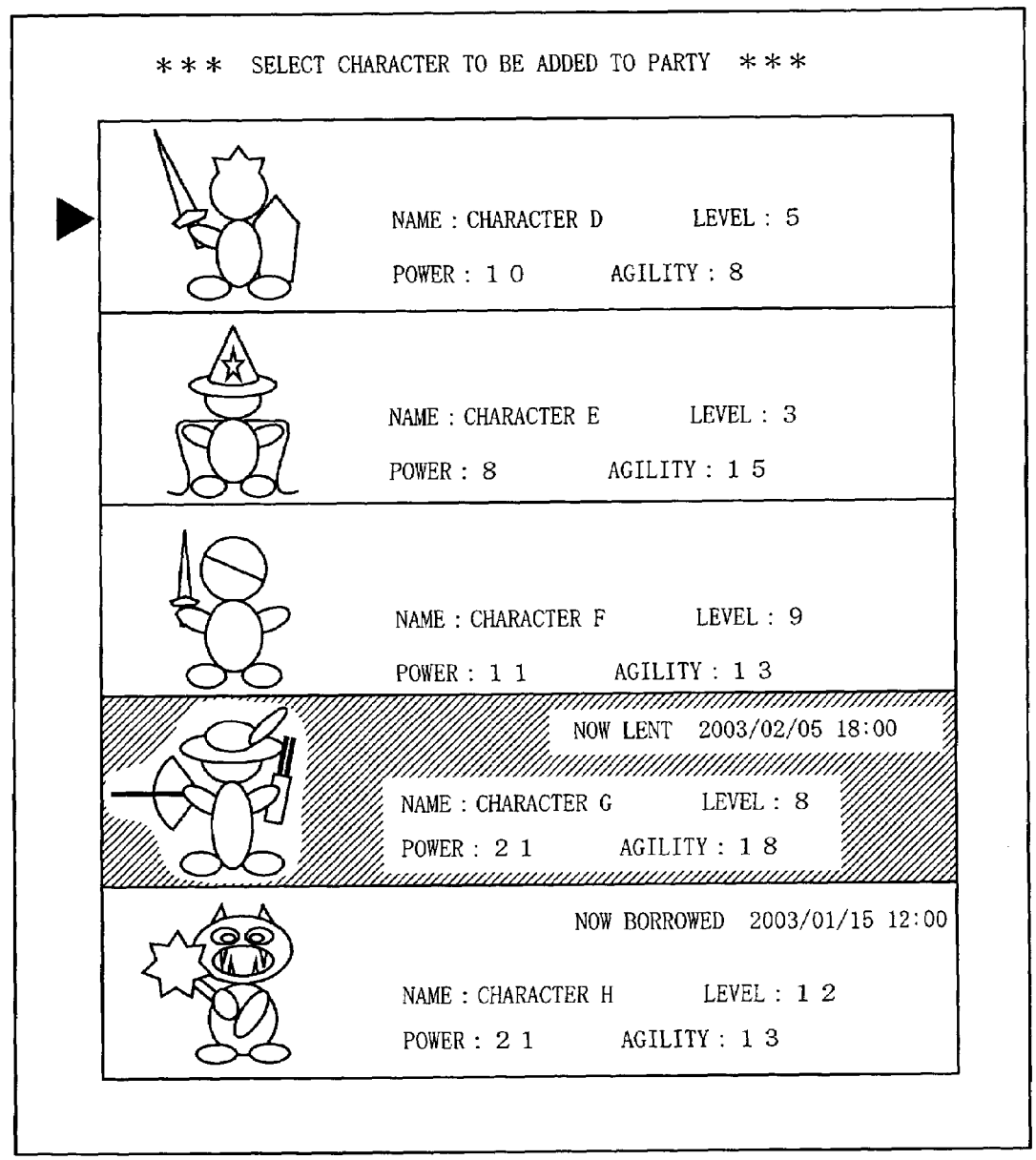
FIG. 11 is an illustration showing an exemplary screen display when a list of characters is displayed in the party organization process.

FIG. 10 shows the party organization process at step S402. First, the CPU core 24 determines whether or not the player gives an instruction to start party organization by using the operation switches 30 (S4021). If the determination is made that no instruction is given, the CPU core 24 ends the party organization, and proceeds to the battle process at step S403 shown in FIG. 8. On the other hand, if the determination is made that an instruction is given to start party organization, the CPU core 24 causes the LCD 21 to display a list of the characters based on the character data table shown in FIG. 6 (S4022). An exemplary screen display of the above-described list is shown in FIG. 11. Note that the character whose lending flag is set is temporarily (that is, until the lending/borrowing expiration time) prohibited to be used in the game. Thus, a display is preferably performed so that the player can recognize that the character (character G) is lent and is not allowed to be selected, as shown in FIG. 11 (a diagonally shaded area). The player specifies a member of the party while watching the screen (S4023). Then, the CPU core 24 determines whether or not the player gives an instruction to end party organization by using the operation switches 30 (S4024). The CPU 24 goes back to step 4022 if the party organization is continued, and proceeds to the battle process at step S403 shown in FIG. 9 if the party organization is ended.

Figure 12:
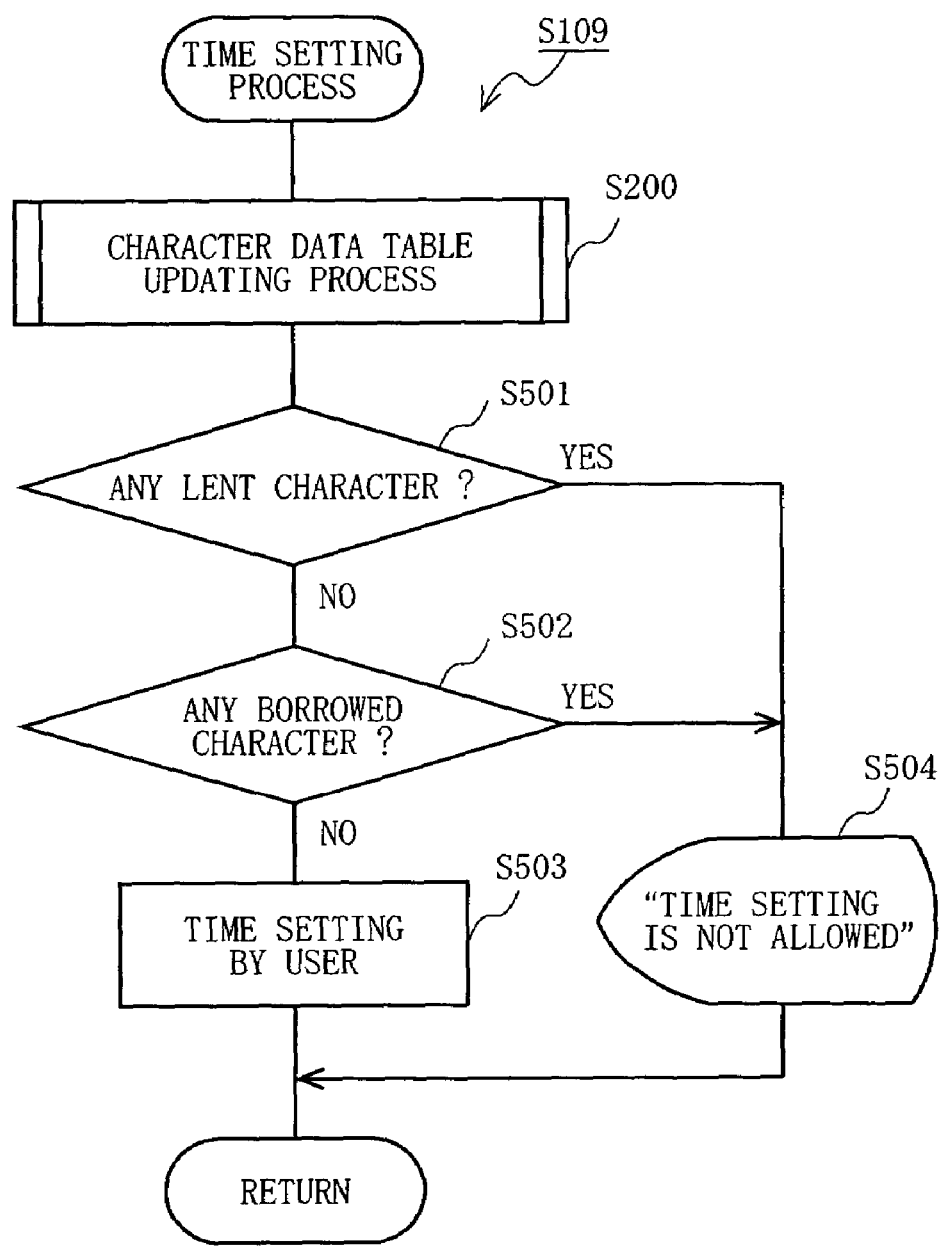
FIG. 12 is a flowchart showing a time setting process.

Next, the time setting process to be executed if the "time setting" item is selected from the menu displayed at step S101 of FIG. 4 (YES at step S108) will be described with reference to a flowchart shown in FIG. 12. When the time setting process is started, the CPU core 24 first executes the character data table updating process (S200). The above-described character data updating process is similar to the process shown in FIG. 7, with the descriptions thereof omitted. Then, with reference to the character data table shown in FIG. 6, the CPU core 24 determines whether or not there is any lent character based on the lending flag (S501). Then, if the determination is made that there is no lent character, the CPU core 24 subsequently determines whether or not there is any borrowed character based on the borrowing flag (S502). Then, if the determination is also made that there is no borrowed character, the CPU core 24 sets a time of the RTC 13 based on the player's instruction received via the operation switches 30 (S503), and ends the time setting process. On the other hand, if the determination is made at step S501 that there is a lent character, or the determination is made at step S502 that there is a borrowed character, the CPU core 24 causes the LCD 21 to display a message "time setting is not allowed" (S504), and ends the time setting process.

As such, arbitrary change of a time of the RTC 13 is prohibited, whereby it is possible to prevent unauthorized change of the lending/borrowing period by the player (for example, it is possible to prevent the lending/borrowing period from being virtually extended by the player who borrows the character by turning back the RTC 13 of the game device). Furthermore, in the present embodiment, a period in which arbitrary change of a time of the RTC 13 is prohibited is limited to the period when there is a lent character or a borrowed character, whereby it is possible to prevent unauthorized change of the lending/borrowing period while allowing the player to correct a time lag of the RTC 13.

As described above, according to the present embodiment, when a character is lent from the first game device to the second game device, the use of the character is temporarily prohibited in the first game device, and the use of the character is prohibited in the second game device when the character is returned. As a result, a copy of the character is not produced, thereby realizing more realistic lending/borrowing, compared to the conventional game system. Also, the first game device and the second game device individually manage the lending/borrowing period, and individually execute a character return process (that is, the first game device executes a process for enabling the use of the character, and the second game device executes a process for disabling the use of the character) after a lapse of the lending/borrowing period. Thus, it is not necessary to perform data communications when the character is returned, thereby saving the trouble of connecting the two devices to each other. Also, it is guaranteed that the character is sure to be returned on the due date.

Note that, in the present embodiment, it is assumed that the respective game devices determine whether or not the lending/borrowing period is expired based on a time of the RTC 13 and the lending/borrowing expiration time, but the present invention is not limited thereto. For example, in place of the RTC 13, a timer for counting up or counting down a numeric value at a constant speed may be provided, whereby it is possible to determine whether or not the lending/borrowing period is expired by determining whether or not the value counted by the timer becomes a predetermined count value, which is shared by the two devices when the character is lent/borrowed. In the case, as described in the present embodiment, where it is determined whether or not the lending/borrowing period is expired based on a time of the RTC 13 and the lending/borrowing expiration time, the player who lends/borrows the character is able to be aware of a return date and time of the character (for example, 10 a.m., April 5), which is an advantage.

Also, in the present embodiment, it is assumed that the RTC 13 is built into the game cartridge 110, but the present invention is not limited thereto. For example, the RTC 13 may be included in the main unit. However, in the case where the RTC 13 is included in the main unit, there is a possibility that time setting of a time of the RTC 13 may be performed during a time period where the game in which the lending/borrowing of a character has been performed is not played (that is, during a time period where a game of another game cartridge is played) in the game device, as described in the present embodiment, which allows various games to be played by changing the game cartridge as appropriate. In this case, it is difficult to prohibit a change of a time of the RTC by a process as shown in FIG. 12. However, the structure having the RTC built into the game cartridge is adopted in the present embodiment, whereby it is possible to effectively prevent a time of the RTC from being set during a time period where another game is played.

Also, in the present embodiment, it is assumed that lending/borrowing of a character is performed between the game devices, but the present invention can be easily applied to a case where an item obtained in the game and a technique or a magic which is used by the character are lent/borrowed Also, in the present embodiment, it is assumed that the game program is supplied from the ROM 11 of the game cartridge 110 to the main unit 100, but the present invention is not limited thereto. The game program may be supplied to the main unit 100 via another arbitrary computer-readable storage medium such as a CD-ROM, a DVD, or a memory card, for example. Furthermore, the game program may be supplied to the main unit 100 via a transmission medium such as the Internet or a communication cable. Still further, the game program may be previously stored in a storage device of the main unit 100.

Also, in the present embodiment, the game device including the main unit 100 and the game cartridge 110 has been described, but the present invention is not limited thereto. The present invention can be applied to a game device whose main unit 100 is united with the game cartridge 110.

Also, in the present embodiment, it is assumed that data communications between the game devices are performed using the communication cable, but the present invention is not limited thereto. The communications between the devices may be, for example, data communications via a network such as the Internet, or radio data communications.

(Second Embodiment)

A case where subletting (that is, lending the game data which has been borrowed from another game device to still another game device) is prohibited has been described in the above first embodiment. However, it is possible to permit subletting. Hereinafter, as a second embodiment, a game system in which subletting is permitted will be described. Note that the hardware structure of each game device is the same as the first embodiment, and an operation of each game device is mostly the same as the first embodiment. Thus, only a portion different from the first embodiment will be described.

Figure 14:
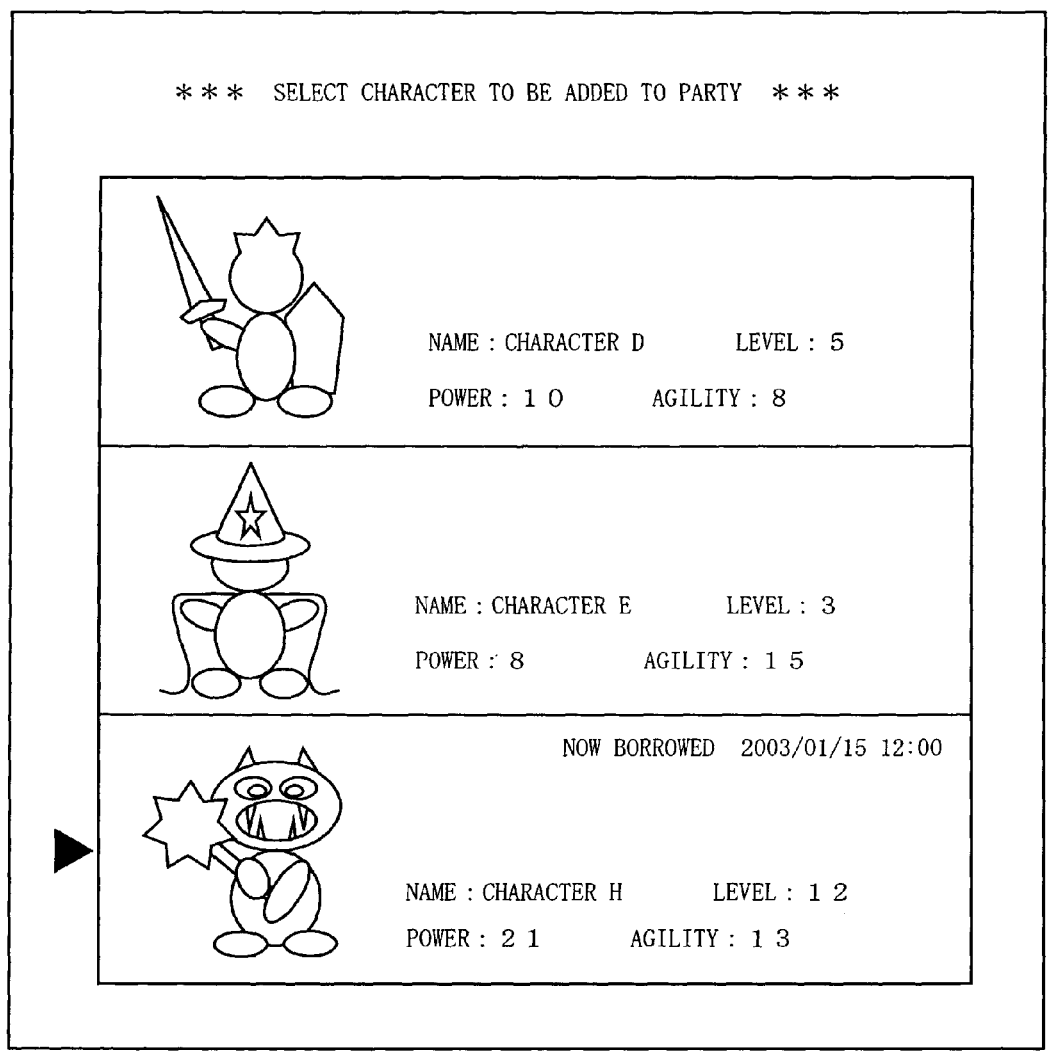
FIG. 14 is an illustration showing an exemplary screen display when a character to be lent is selected in the case of realizing subletting.
Figure 15:
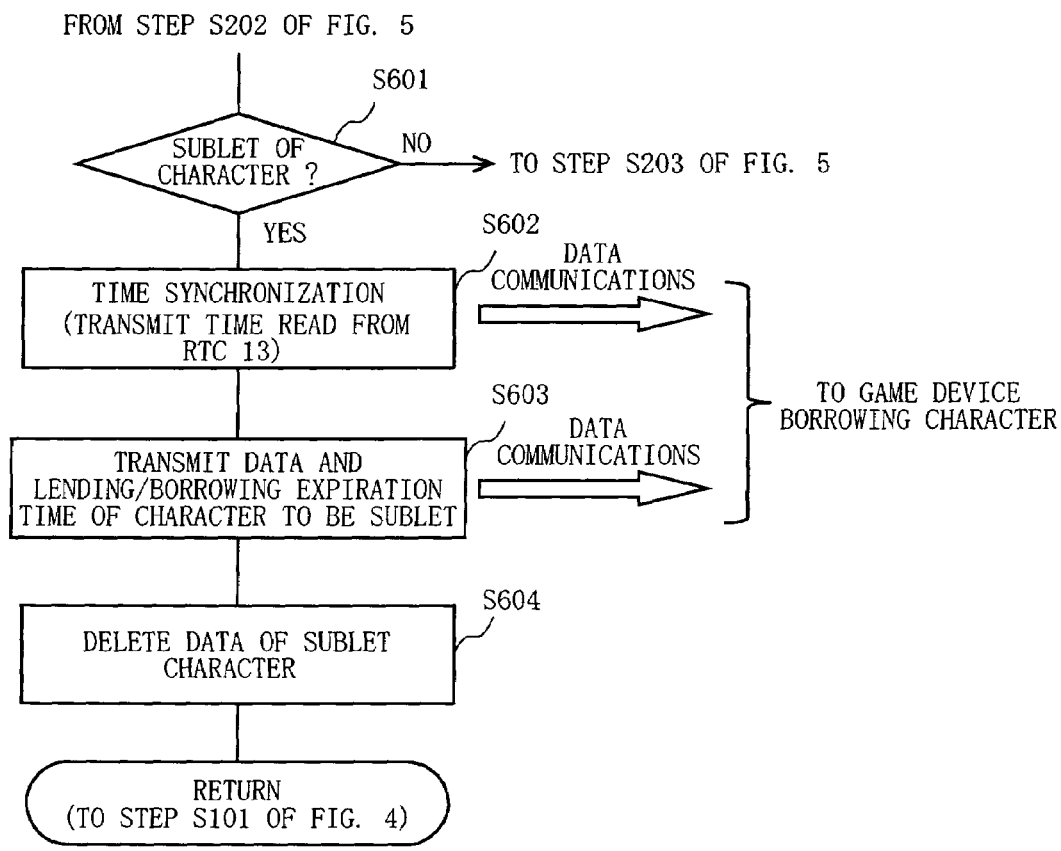
FIG. 15 is a flowchart showing a portion of a lending process when subletting is performed.

First, in the second embodiment, when a character is lent from the first game device to the second game device, the lending permission/non-permission flag of the character (in this case, character H) is set in the character data table of the second game device. Thus, in the case where the character is sublet from the second game device to another game device (hereinafter, referred to as a third game device), the CPU core 24 of the second game device causes the LCD 21 to display the borrowed character, as shown in FIG. 14, at step S201 of the lending process shown in FIG. 5. The player selects a character to be lent to the third game device from the displayed list of characters (S202). The following operation is described with reference to a flowchart shown in FIG. 15.

When the player selects a character, the CPU core 24 of the second game device determines whether or not lending of the character selected by the player is subletting (S601). Specifically, the CPU core 24 of the second device determines whether or not the borrowing flag of the character selected by the player is set in the character data table. If the determination is made that it is not subletting, the process proceeds to step S203 of FIG. 5. The process following step S203 is the same as in the first embodiment, with the descriptions thereof omitted. On the other hand, if the determination is made that it is subletting, the CPU core 24 of the second game device synchronizes a time of the RTC 13 of the second game device and a time of the RTC 13 of the third game device (S602). Specifically, a time of the RTC 13 of the second game device is transmitted to the third game device, and a time of the RTC 13 of the third game device is set based on the above-described transmitted time. Next, the data and the lending/borrowing expiration time of the character, which is to be sublet, in the character data table are transmitted to the third game device (S603). As is the case with the first embodiment, the third game device performs the character data table updating process based on these data. Then, the CPU core 24 of the second game device deletes the data of the sublet character from the character data table (S604), and ends the lending process.

As such, when the character is sublet from the second game device to the third game device, a time of the RTC 13 of the third game device is adjusted to a time of the RTC 13 of the second game device. Note that the RTC 13 of the first game device, which is an original lender of the character, is synchronized with the RTC 13 of the second game device when the character is lent from the first game device to the second game device, and a time of the RTC 13 of the third game device is adjusted to a time of the RTC 13 of the second game device when the character is sublet from the second game device to the third game device. As a result, a time of the RTC 13 of the first game device coincides with a time of the RTC 13 of the third game device. On the other hand, the lending/borrowing expiration time shared between the first game device and the second game device is transmitted to the third game device. As a result, the lending/borrowing expiration time managed by the character data table of the first game device coincides with the lending/borrowing expiration time managed by the character data table of the third game device. Thus, a character return timing is shared between the first game device and the third game device.

Also, according to the present embodiment, in the case where the second game device sublets the character, which is lent from the first game device, to the third game device, it is not necessary to perform data communications between the first game device and the second game device or between the first game device and the third game device when the character is returned. That is, the two game devices are not required to be connected to each other when the character is returned. Furthermore, in general, when subletting is performed, there is a high possibility that the sublet character is never returned to the original lender. However, the present embodiment guarantees that the character is sure to be returned on a due date even if subletting is performed.

While the invention has been described in detail, the foregoing description is in all aspects illustrative and not restrictive. It is understood that numerous other modifications and variations can be devised without departing from the scope of the invention.

What is claimed is:

1. A game system comprising a plurality of game devices, any one of said game devices capable of managing a transfer of game data between another one of said devices, wherein the respective game devices comprise:
    a game data storage device for storing game data usable in a game;
    a game data process executing mechanism to execute a game process using data stored in the game data storage device;
    a counter used to indicate elapsed time;
    a lending/borrowing period information setting mechanism to set lending/borrowing period information that is shared with another game device, said information used to determine a lending/borrowing period for lending/borrowing game data when a transfer of game data for a lending/borrowing operation of game data is initiated between game devices;
    a period expiration determining mechanism that monitors the counter and determines whether or not a lending/borrowing period is expired, based on lending/borrowing period information set by the lending/borrowing period information setting mechanism; and
    a game data use controlling mechanism that controls use of transferred game data within a game device, wherein a game data use controlling mechanism of a first game device, which is a game device which lends the game data, temporarily disables use of the game data in the first game device at a time of initiating a lending of the game data to a second game device, which is a game device which borrows the game data, and subsequently enables use of the game data in the first game device when a determination is made by the period expiration determining mechanism of the first game device that a set lending/borrowing period of the game data has expired, and further wherein
    a game data use controlling mechanism of the second game device temporarily enables use of borrowed game data in the second game device at a time of receiving lent game data from the first game device, and subsequently disables use of the game data in the second game device when a determination is made by the period expiration determining mechanism of the second game device that a set lending/borrowing period of the game data has expired.

2. The game system according to claim 1, wherein
    the lending/borrowing period information setting mechanism sets an expiration date of the lending/borrowing period of the game data,
    the counter is a real time clock for counting a real time, and wherein when the game data is lent from the first game device to the second game device, the lending/borrowing expiration time of the game data shared between the first game device and the second game device is set, and wherein
    the period expiration determining mechanism of the first game device determines whether or not the lending/borrowing period is expired based on the lending/borrowing expiration time set by the lending/borrowing period information setting mechanism of the first game device and a real time of the clock of the first game device, and the period expiration determining mechanism of the second game device determines whether or not the lending/borrowing period is expired based on the lending/borrowing expiration time set by the lending/borrowing period information setting mechanism of the second game device and a real time of the clock of the second game device.

3. The game system according to claim 2, wherein a real time of the clock of the first game device and a real time of the clock of the second game device are synchronized by data communications when the game data is lent from the first game device to the second game device.

4. The game system according to claim 2, wherein one or more game devices further include a real time setting mechanism, wherein the real time setting mechanism enables a player to change a time of the clock if there is no lent/borrowed game data, and prohibiting the player from changing a time of the clock if there is any lent/borrowed game data.

5. The game system according to claim 2, wherein
one or more game devices execute a game process by connecting a game cartridge storing a game program to a common main unit that executes a game process based on the game program, and
the real time clock is built into the game cartridge and counts a real time irrespective of whether or not the game cartridge is connected to the main unit.

6. The game system according to claim 1, wherein a count value of the time counter is not capable of being changed by the player.

7. The game system according to claim 1, wherein
the second game device notifies a third game device of the lending/borrowing period information of the game data, which is shared between the first game device and the second game device, at a time of initiating a subletting of the game data borrowed from the first game device to the third game device, and the game data use controlling mechanism of the second game device disables use of the game data in the second game device, and
the game data use controlling mechanism of the third game device temporarily enables use of the game data in the third game device at a time of receiving the game data from the second game device, and subsequently disables use of the game data in the third game device when a determination is made by a period expiration determining mechanism of the third game device that a lending/borrowing period based on the lending/borrowing period information, which is notified by the second game device, has expired.

8. The game system according to claim 6, wherein
the time counter is a real time clock for counting a real time,
the period expiration determining mechanism determines whether or not the lending/borrowing period is expired based on a time of the clock, and wherein
a time of the real time clock of the first game device and a time of the real time clock of the second game device are synchronized by data communications when the game data is lent from the first game device to the second game device, and a time of the real time clock of the third game device is adjusted to a time of the real time clock of the second game device by data communications when the game data is sublet from the second game device to the third game device.

9. A game device operable to exchange game data with another game device, comprising:
a game data storage device for storing game data usable in a game;
a game data process executing mechanism to execute a game process using data stored in the game data storage device;
a counter used to indicate elapsed time;
a lending/borrowing period information setting mechanism to set lending/borrowing period information that is shared with another game device, said information used to determine a lending/borrowing period for lending/borrowing game data when a transfer of game data for a lending/borrowing operation of game data is initiated between game devices;
a period expiration determining mechanism for determining whether or not the lending/borrowing period is expired based on lending/borrowing period information that is shared between game devices, after a lending/borrowing of the game data is initiated between game devices; and
a game data use controlling mechanism for controlling use of individual game data in the game, wherein
the game data use controlling mechanism temporarily disables use of the game data at a time of lending the game data to another game device which borrows the game data, and subsequently enables use of the game data when a determination is made by the period expiration determining mechanism that the lending/borrowing period for the game data has expired.

10. The game device according to claim 9, further comprising a lending/borrowing expiration time storage device for storing a lending/borrowing expiration time of the game data, wherein
the counter is a real time clock, wherein when the game data is lent to another game device, a lending/borrowing expiration time for the game data, which is shared with another game device, is stored in the lending/borrowing expiration time storage device, and wherein
the period expiration determining mechanism determines whether or not the lending/borrowing period is expired based on the lending/borrowing expiration time stored in the lending/borrowing expiration time storage device and a time indicated by the real time clock.

11. The game device according to claim 10, wherein a time of the real time clock thereof is synchronized with a time of a real time clock of another game device by data communications when the game data is lent to another game device which borrows the game data.

12. The game device according to claim 9, wherein, when game data that was borrowed from a first game device, which is another game device which lends the game data, is sublet to a third game device, the third game device is notified of the lending/borrowing period information of the game data and the game data use controlling mechanism disables use of the game data in a second game device.

13. A computer-readable storage medium storing a game program that is executable by a game system processor to enable an exchange of game data between a plurality of game devices, wherein the game program causes a game system processor of a game device to function as:
a game program process executing mechanism that execute a game process using data stored in a game data storage device, said game data including game data;
a lending/borrowing period information setting mechanism to set lending/borrowing period information that is shared with another game device said information used to determine a lending/borrowing period for lending/borrowing game data, when a transfer of game data for a lending/borrowing operation of game data is initiated between the game devices;
a period expiration determining mechanism that monitors the counter and determines whether or not a lending/borrowing period is expired, in accordance with a time counter included in the respective game devices for counting a time, based on the lending/borrowing period information set by the lending/borrowing period information setting mechanism; and
a game data use controlling mechanism for controlling use of individual game data in the game, and wherein
the game data use controlling mechanism of a first game device, which is a game device which lends the game data, temporarily disables use of the game data in the first game device at a time of lending the game data to a second game device, which is a game device which borrows the game data, and subsequently enables use of the game data in the first game device when a determination is made by the period expiration determining mechanism of the first game device that the lending/borrowing period of the game data has expired, and wherein the game data use controlling mechanism of the second game device temporarily enables use of the game data in the second game device at a time of borrowing the game data from the first game device, and subsequently disables use of the game data in the second game device when a determination is made by the period expiration determining mechanism of the second game device that the lending/borrowing period of the game data has expired.

14. The storage medium according to claim 13, wherein the lending/borrowing period information setting mechanism sets an expiration time of the lending/borrowing period of the game data, the time counter is a clock for counting a real time, and wherein when the game data is lent from the first game device to the second game device, the lending/borrowing expiration time of the game data shared between the first game device and the second game device is set, and the period expiration determining mechanism of the first game device determines whether or not the lending/borrowing period is expired based on the lending/borrowing expiration time set by the lending/borrowing period information setting mechanism of the first game device and a time of the real time clock of the first game device, and the period expiration determining mechanism of the second game device determines whether or not the lending/borrowing period is expired based on the lending/borrowing expiration time set by the lending/borrowing period information setting mechanism of the second game device and a time of the real time clock of the second game device.

15. The storage medium according to claim 14, wherein the respective game system processor of the first game device and the second game device are caused to execute a process of synchronizing a time of the real time clock of the first game device with a time of the real time clock of the second game device when game data is lent from the first game device to the second game device.

16. The storage medium according to claim 13, wherein the game system processor of the second game device is caused to execute a process of notifying a third game device of the lending/borrowing period information of the game data, which is shared between the first game device and the second game device, at a time of subletting the game data borrowed from the first game device to the third game device, the game data use controlling mechanism of the second game device disables use of the game data in the second game device at a time of subletting the game data borrowed from the first game device to the third game device, and the game data use controlling mechanism of the third game device temporarily enables use of the game data in the third game device at a time of borrowing the game data from the second game device, and subsequently disables use of the game data in the third game device when a determination is made by the period expiration determining mechanism of the third game device that the lending/borrowing period notified by the second game device has expired.

17. A game cartridge comprising a computer-readable storage medium storing a game program, said game program capable of enabling a transfer of a game data between game device, said game data being capable of being transferred amongst a plurality of game devices, said game cartridge including a game data storage device for storing game data usable in the game, and said game cartridge also including a time counter indicating elapsed time, wherein the game program data causes a computer of the game device to function as:

a game program process executing mechanism for executing a game process using the data stored in the game data storage device;

a lending/borrowing period information setting mechanism which sets lending/borrowing period information this shared with another game device, said lending/borrowing period information being used for setting a lending/borrowing period when a lending/borrowing operation comprising a transfer of game data is performed between the game devices;

a period expiration determining mechanism for determining whether or not the lending/borrowing period is expired, in accordance with the time counter, based on the lending/borrowing period information set by the lending/borrowing period information setting mechanism; and a game data use controlling mechanism for controlling use of individual game data in the game, and wherein the game data use controlling mechanism is operable to:

temporarily disable use of the game data at a time of lending the game data to another game device, and subsequently enable use of the game data when a determination is made by the period expiration determining mechanism that the lending/borrowing period of the game data has expired; and temporarily enable use of the game data at a time of borrowing the game data from another game device, and subsequently disable use of the game data when a determination is made by the period expiration determining mechanism that the lending/borrowing period of the game data has expired.

* * * * *